(12) United States Patent
Lee et al.

(10) Patent No.: US 12,459,575 B2
(45) Date of Patent: Nov. 4, 2025

(54) VEHICLE BODY REAR STRUCTURE

(71) Applicants: HYUNDAI MOTOR COMPANY, Seoul (KR); Kia Corporation, Seoul (KR)

(72) Inventors: Jung-Deok Lee, Hwaseong-si (KR); Seongwook Seo, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 424 days.

(21) Appl. No.: 17/990,174

(22) Filed: Nov. 18, 2022

(65) Prior Publication Data
US 2023/0399059 A1 Dec. 14, 2023

(30) Foreign Application Priority Data
Jun. 8, 2022 (KR) .................. 10-2022-0069675

(51) Int. Cl.
| | |
|---|---|
| *B62D 25/08* | (2006.01) |
| *B60R 19/24* | (2006.01) |
| *B62D 25/04* | (2006.01) |
| *B62D 25/20* | (2006.01) |
| *B62D 27/02* | (2006.01) |

(52) U.S. Cl.
CPC ............. *B62D 25/08* (2013.01); *B60R 19/24* (2013.01); *B62D 25/04* (2013.01); *B62D 25/2027* (2013.01); *B62D 27/023* (2013.01)

(58) Field of Classification Search
CPC .... B62D 25/08; B62D 25/04; B62D 25/2027; B62D 25/087; B62D 27/023; B62D 29/041; B62D 29/043
USPC ................ 296/203.01, 4, 193.4, 6, 8, 29, 30
See application file for complete search history.

(56) References Cited

U.S. PATENT DOCUMENTS

| | | | |
|---|---|---|---|
| 6,102,470 A * | 8/2000 | Heim ................... | B62D 25/087 293/133 |
| 6,846,037 B2 * | 1/2005 | Engels ................. | B62D 25/087 296/187.11 |

* cited by examiner

*Primary Examiner* — Dennis H Pedder
(74) *Attorney, Agent, or Firm* — MORGAN, LEWIS & BOCKIUS LLP (57) ABSTRACT

A vehicle body rear structure includes a cabin, a cross member, and a rear module mounting panel connected to the cabin, at least a portion thereof contacting with the cross member and the rear module mounting panel of which a mounting portion connected to a body rear element is formed thereto, and the cross member is disposed within the rear module mounting panel.

20 Claims, 6 Drawing Sheets

VEHICLE BODY REAR STRUCTURE

CROSS-REFERENCE TO RELATED APPLICATION

The present application claims priority to Korean Patent Application No. 10-2022-0069675 filed on Jun. 8, 2022, the entire contents of which is incorporated herein for all purposes by this reference.

BACKGROUND OF THE PRESENT DISCLOSURE

Field of the Present Disclosure

The present disclosure relates to a structure at the rear of a vehicle body. More particularly, the present disclosure relates to a vehicle body rear structure for securing vehicle body strength and crash performance.

Description of Related Art

Carbon Fiber Reinforced Plastic (CFRP) is a composite material using carbon fiber as a reinforcing material and thermosetting resin or thermoplastic resin as a matrix.

CFRP is being used in vehicle body manufacturing because of its relatively light weight and size.

In particular, it can play a role in reducing the injury of the occupant in the cabin by making the cabin room where the occupant is riding with CFRP material.

However, when the CFRP material is combined with the cabin room and the structure at the rear of the vehicle body, mechanical coupling is required, and a response to improve the rear impact performance of the vehicle body is required.

As the spread of environment-friendly electric vehicles (EVs) has become common, the weight of vehicles provided with large capacity batteries is relatively increased, and the demand for a more robust vehicle body is increasing. Therefore, countermeasures to prevent battery damage in the event of a vehicle collision are required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body rear structure which may improve the performance of the vehicle body by diversifying the load transmission path and securing strength.

A vehicle body rear structure according to various exemplary embodiments of the present disclosure may include a cabin, a cross member, and a rear module mounting panel connected to the cabin, at least a part thereof contacting with the cross member and the rear module mounting panel of which a mounting portion connected to a body rear element is formed thereto, and the cross member may be internally disposed within the rear module mounting panel.

The mounting portion may include a rear protruding portion connected to the body rear element a support portion contacting with the cross member, and an internal connection connecting the rear protruding portion and the support portion.

A thickness of the support portion and the internal connection may be formed to be thicker than other thicknesses of at least a portion of the mounting portion.

The cross member may include a main cross surface directly in contact with the support portion, and a cross member horizontal surface disposed toward the part where the support portion and the internal connection are connected.

The rear protruding portion may include a first mounting protruding portion connected to a vehicle body rear module, and a second mounting protruding portion connected to a rear sub-frame.

The cabin may include a partition panel formed at a rear thereof, and the rear module mounting panel may include a front connection portion connected to the partition panel.

The rear module mounting panel may further include a module connection portion for connecting the mounting portion and the front connection portion.

The rear module mounting panel may include a protrude connection portion formed to protrude to the mounting portion and the module connection portion.

The vehicle body rear structure according to various exemplary embodiments of the present disclosure may further include a battery cover disposed between the cabin and the cross member and a part thereof is in contact with the cross member.

The rear module mounting panel may further include a bent portion connecting the mounting portion and the module connection portion, and the bent portion may support the battery cover.

The battery cover may include a battery lower flange connected to the cross member and the rear module mounting panel.

The cabin may include rear pillars formed on first and second sides of a vehicle body in a vertical direction of the vehicle body, and the rear module mounting panel may connect the rear pillars on both sides.

The rear pillar may include a pillar panel support portion curved to surround the rear module mounting panel.

The mounting portion may be formed adjacent to the pillar panel support portion.

The rear module mounting panel may include a front protruding portion forming a first load path that transmits a collision load in a forward direction of the vehicle body, and a width direction inclined portion forming a second load path that transmits the collision load in a width direction of the vehicle body.

The rear module mounting panel may include a main body enclosing the cross member.

The rear module mounting panel may be made of CFRP material.

The cross member may be made of steel material.

The cabin may include a cabin rear protruding portion protruded toward the rear module mounting panel.

According to the vehicle body rear structure according to various exemplary embodiments of the present disclosure, the performance of the vehicle body may be improved by reducing the entire number of parts while diversifying the load transmission path and securing strength.

Furthermore, for the effects which may be obtained or predicted due to various exemplary embodiments of the present disclosure, it is to be included directly or implicitly in the detailed description of various exemplary embodiments of the present disclosure. That is, various effects predicted according to various exemplary embodiments of the present disclosure will be included within a detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown.

As those skilled in the art would realize, the described embodiments may be modified in various different ways, all without departing from the spirit or scope of the present disclosure.

To clearly explain an exemplary embodiment of the present disclosure, parts irrelevant to the description are omitted, and the same reference numerals are assigned to the same or similar elements throughout the specification.

Because the size and thickness of each component shown in the drawing are arbitrarily indicated for convenience of explanation, the present disclosure is not necessarily limited to the one shown in the drawing, and the thickness is enlarged to clearly express various parts and areas.

Furthermore, in the following detailed description, the names of the components include first, second, etc., to classify the components in the same relationship, and the order is not necessarily limited in the following description.

Throughout the specification, when it is said that a certain part includes certain constituent elements, this means that other constituent elements may be further included, rather than excluding other constituent elements, unless specifically stated otherwise.

Furthermore, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

Figure 1:
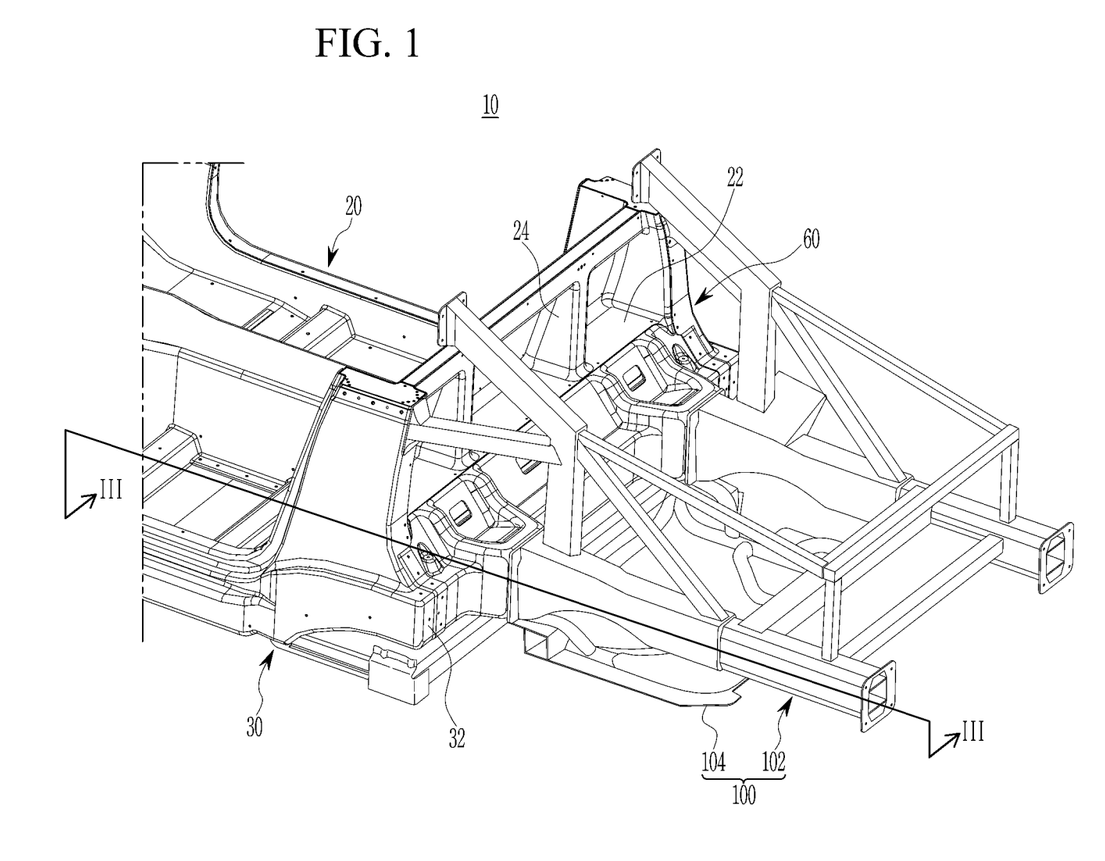
FIG. 1 is a perspective view of a vehicle body rear structure according to various exemplary embodiments of the present disclosure.
Figure 2:
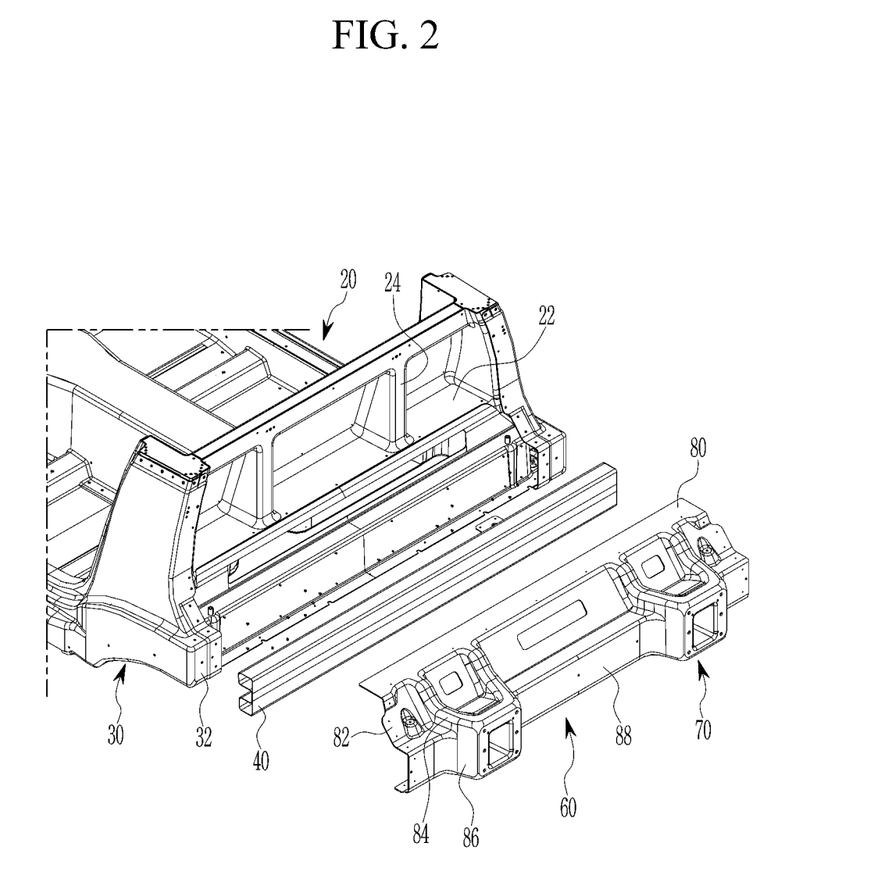
FIG. 2 is a partially exploded perspective view of the vehicle body rear structure according to various exemplary embodiments of the present disclosure.

FIG. 1 is a perspective view of a vehicle body rear structure according to various exemplary embodiments of the present disclosure, and FIG. 2 is a partially exploded perspective view of the vehicle body rear structure according to various exemplary embodiments of the present disclosure.

Referring to FIG. 1 and FIG. 2, a vehicle body 10 of which a vehicle body rear structure according to various exemplary embodiments of the present disclosure is applied may include a cabin 20, a cross member 40, and a rear module mounting panel 60 connected to the cabin 20, at least a portion thereof contacting with the cross member 40, and the rear module mounting panel 60 of which a mounting portion 70 connected to a body rear element 100 is formed thereto.

The cross member 40 may be internally disposed within the rear module mounting panel 60.

Also, the cross member 40 may be disposed in the width direction of the cabin 20.

The cabin 20 may be formed of Carbon Fiber Reinforced Plastic (CFRP) material.

Here, the body rear element 100 may include a vehicle body rear module 102 forming a rear skeleton of the vehicle body 10 and a rear sub-frame 104 forming a skeleton of the rear suspension system.

The vehicle body rear module 102 may be made of a steel material which is economical and may guarantee strength, and may also be manufactured in the form of an aluminum module which may reduce vehicle weight.

Also, alternatively, the vehicle body rear module 102 is a CFRP material, which may guarantee the strength of the vehicle and reduce the weight of the vehicle.

The rear sub-frame 104 may be formed of a metal material to support the load on the road surface.

Specific configurations and materials of the vehicle body rear module 102 and the rear sub-frame 104 are obvious to those skilled in the art, and detailed descriptions thereof will be omitted.

The vehicle body 10 to which the vehicle body rear structure according to various exemplary embodiments of the present disclosure is applied may increase the strength while reducing the vehicle body weight by making the cabin 20 CFRP material, so that the protection of the occupant is possible.

However, the cabin 20 of the CFRP material and the body rear element 100 require mechanical connection, and in mechanical coupling, securing the strength of the vehicle body and responding to a collision is required.

The rear module mounting panel 60 is connected to the cabin 20 and at least portion of it is in contact with the cross member 40 to distribute the collision load transmitted from the body rear element 100 to the front of the vehicle body 10 in the event of a rear collision of the vehicle.

That is, the mounting portion 70 of the rear module mounting panel 60 is formed to protrude to facilitate assembly with the body rear element 100, and the mounting portion 70 may primarily support the impact load transmitted from the body rear element 100.

Furthermore, the rear module mounting panel 60 transmits the impact load transmitted from the body rear element 100 to the cross member 40 by contacting at least a portion of the cross member 40 facilitating distribution of the impact load.

Furthermore, the rear module mounting panel 60 may be formed of CFRP material, which may improve the torsional strength of the vehicle body 10 while minimizing the increase in vehicle weight.

The cross member 40 may be formed of a steel material and may distribute the impact load transmitted from the rear module mounting panel 60 to the cabin 20 in the event of a rear impact of the vehicle.

Figure 3:
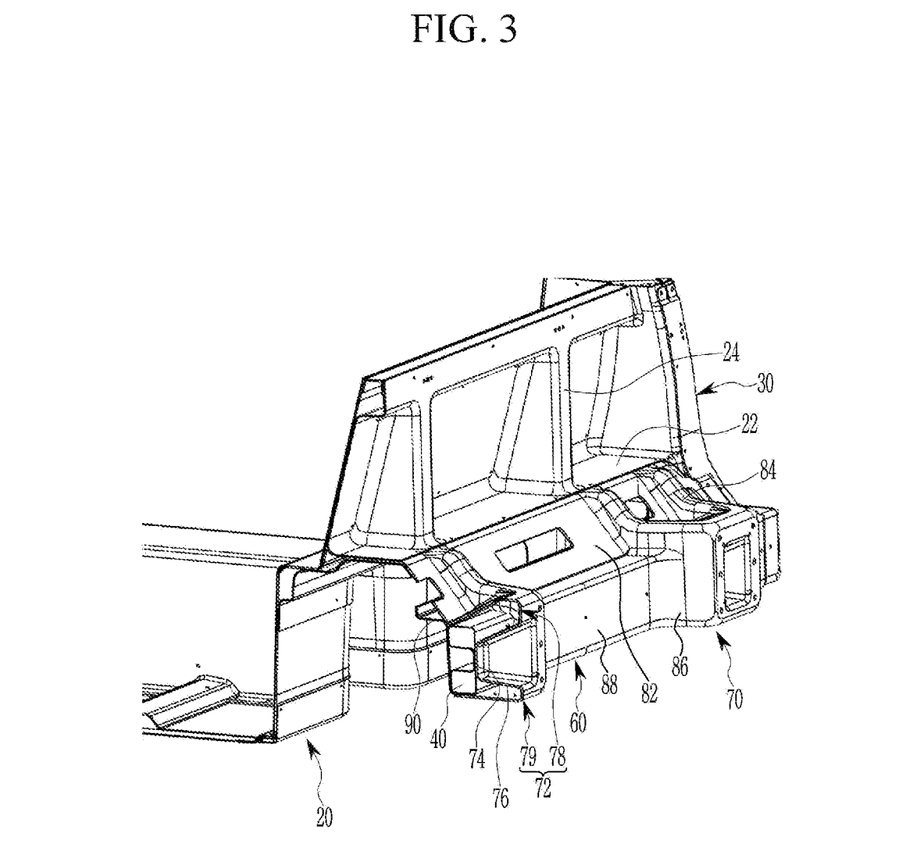
FIG. 3 is a cross-section perspective view along line of FIG. 1.
Figure 4:
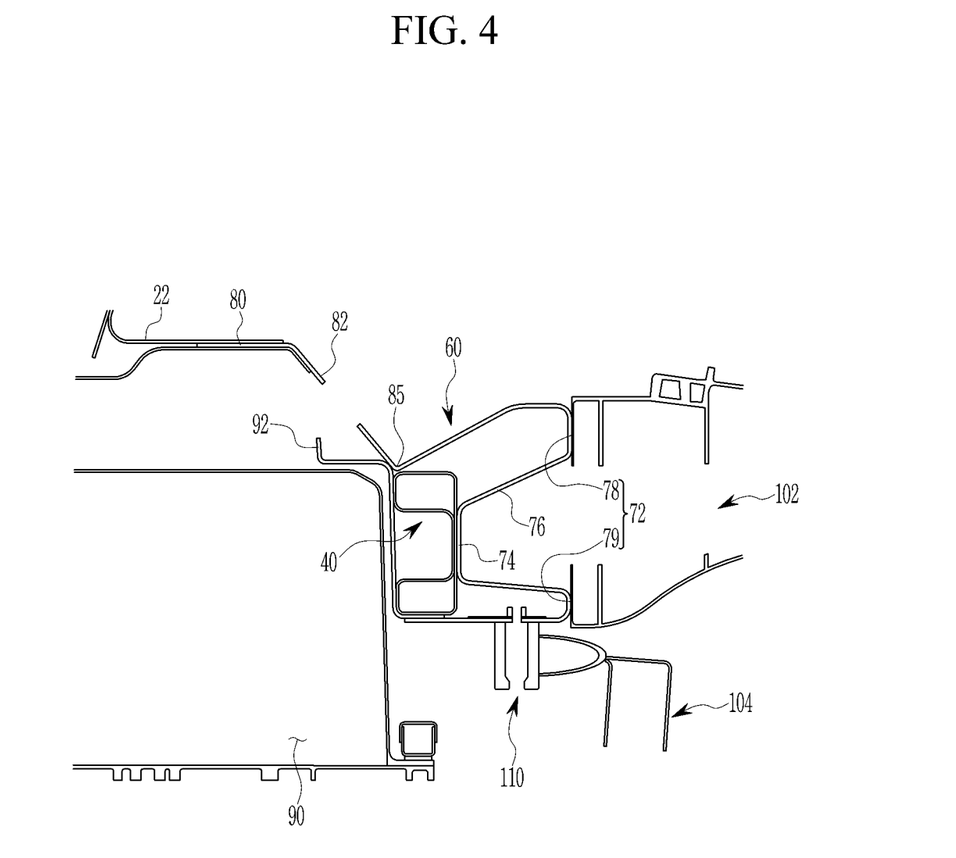
FIG. 4 is a cross-sectional view along the line in FIG. 1.
Figure 5:
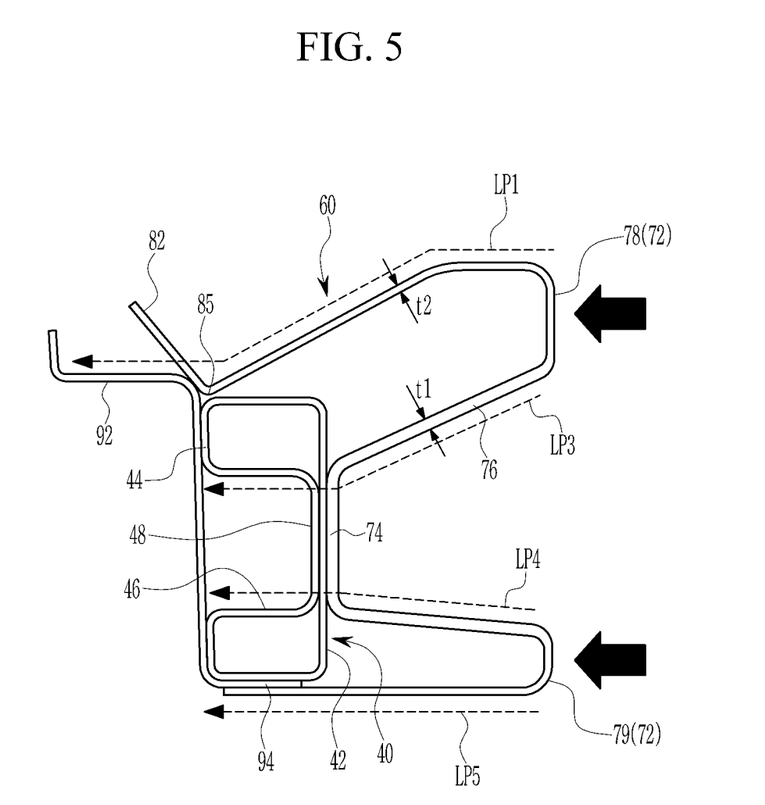
FIG. 5 is a part enlarged view of FIG. 4.

FIG. 3 is a cross-section perspective view along line III-III of FIG. 1, FIG. 4 is a cross-sectional view along the line III-III in FIG. 1, and FIG. 5 is a part enlarged view of FIG. 4.

Referring to FIG. 1 to FIG. 5, the mounting portion 70 may include a rear protruding portion 72 connected to the body rear element 100, a support portion 74 contacting with the cross member 40, and an internal connection 76 connecting the rear protruding portion 72 and the support portion 74.

The shape of the mounting portion 70 is a protrude three-dimensional shape, so it is easy to assemble with the body rear element 100, supports the impact load transmitted from the body rear element 100, and when an excessive load is transmitted, the mounting portion 70 is damaged or deformed and may absorb impact loads.

A thickness of the support portion 74 and the internal connection 76 may be formed to be thicker than other thicknesses of at least a portion of the mounting portion 70.

For example, as shown in FIG. 5, the thickness of the support portion 74 and the internal connection 76, that is, the thickness t1 of the internal side of the mounting portion is formed to be thicker than the thickness t2 of the external side of the mounting portion so that in the event of a rear collision of the vehicle, the impact load transmitted from the body rear element 100 may be smoothly transmitted to the cross member 40.

Furthermore, the thickness t1 of the internal side of the mounting portion 70 is formed to be relatively thick to prevent damage to the mounting portion 70.

In an exemplary embodiment of the present invention, the support portion 74 and the internal connection 76 are connected to each other with an obtuse angle.

The rear protruding portion 72 may include a first mounting protruding portion 78 connected to the vehicle body rear module 102, and a second mounting protruding portion 79 connected to the rear sub-frame 104.

The vehicle body rear module 102 may be mechanically connected to the first mounting protruding portion 78 through a bolt, etc., and the rear sub-frame 104 may be mechanically directly connected to the second mounting protruding portion 79, or connected through a mounting bracket 110.

The first mounting protruding portion 78 and the second mounting protruding portion 79 are protruded, so it is easy to connect to the body rear element 100, and due to the three-dimensional shape, it is easy to distribute the impact load, and it is damaged or deformed when an excessive load is applied and can absorb the impact energy.

Referring to FIG. 2, FIG. 3 and FIG. 4, the cabin 20 may include a partition panel 22 formed at a rear thereof, and the rear module mounting panel 60 may include a front connection portion 80 connected to the partition panel 22.

The cabin 20 and the rear module mounting panel 60 are connected through the partition panel 22 and the front connection portion 80, and the impact load transmitted from the body rear element 100 in the event of a rear collision of the vehicle may be distributed to the cabin 20.

The cabin 20 may include a cabin rear protruding portion 24 protruded toward the rear module mounting panel 60.

The strength of the cabin 20 is strengthened by the protrude shape of the cabin rear protruding portion 24, and the impact load transmitted through the front connection portion 80 may be distributed to the cabin 20.

The rear module mounting panel 60 may further include a module connection portion 82 for connecting the mounting portion 70 and the front connection portion 80.

The module connection portion 82 is inclined to connect the mounting portion 70 and the front connection portion 80, and may distribute the impact load transmitted from the body rear element 100 to the cabin 20 in case of a rear collision of the vehicle.

Figure 6:
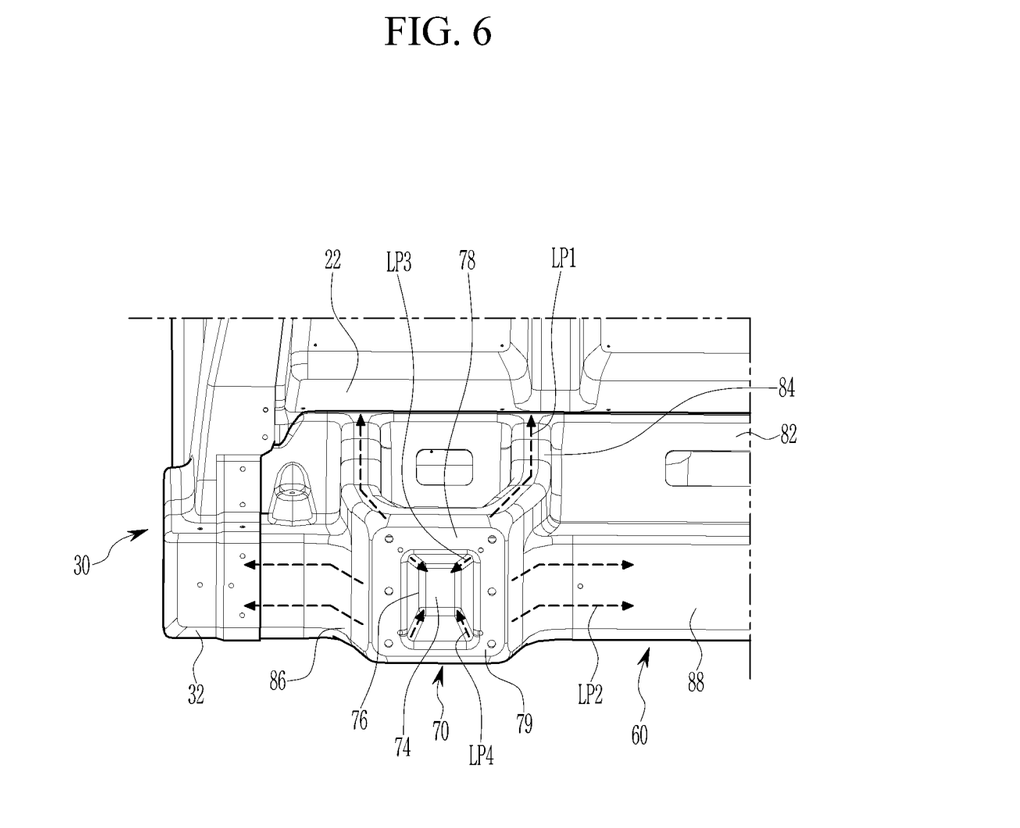
FIG. 6 is a partial rear view of the vehicle body rear structure according to various exemplary embodiments of the present disclosure.

Referring to FIG. 6, the rear module mounting panel 60 may include a protrude connection portion 84 formed to protrude to the mounting portion 70 and the module connection portion 82.

The protrude shape of the protrude connection portion 84 prevents damage caused by the impact load transmitted from the body rear element 100, and may distribute the impact load to the cabin 20.

Referring to FIG. 4 and FIG. 5, the vehicle body rear structure according to various exemplary embodiments of the present disclosure may further include a battery cover 92 disposed between the cabin 20 and the cross member 40 and a part thereof is in contact with the cross member 40.

The rear module mounting panel 60 includes a bent portion 85 connecting the mounting portion 70 and the module connection portion 82, and the bent portion 85 may support the battery cover 92.

The battery cover 92 covers the battery 90 to protect the battery 90 from impact loads, and the impact load transmitted from the body rear element 100 may be distributed to the cabin 20.

Furthermore, the battery cover 92 may include a battery lower flange 94 connected to the cross member 40 and the rear module mounting panel 60.

The drawing shows that the battery lower flange 94 is connected between the cross member 40 and the rear module mounting panel 60, but is not limited thereto, and various types of connection are possible.

The cross member 40 may include a main cross surface 42 directly in contact with the support portion 74, and a cross member horizontal surface 46 disposed toward the part where the support portion 74 and the internal connection 76 are connected.

Furthermore, the cross member 40 may include a cross member front surface 44 connected to the main cross surface 42 and the cross member horizontal surface 46 and disposed toward the front of the vehicle body 10, and a cross member rear surface 48 connected to the cross member horizontal surface 46 and contacting to the main cross surface 42.

The main cross surface 42 and the cross member rear surface 48 are in contact with the support portion 74 in doubly and may receive the impact load transmitted from the body rear element 100, so that the impact load may be smoothly distributed.

The battery cover 92 may receive an impact load transmitted from the body rear element 100 in contact with the cross member front surface 44.

Furthermore, the front end portion of the battery cover 92 is connected to the partition panel 22 and the module connection portion 82 to distribute the impact load transmitted from the body rear element 100 to the cabin 20.

As shown in FIG. 2 and FIG. 6, the cabin 20 includes rear pillars 30 formed on both sides of vehicle body 10 in the vertical direction of vehicle body 10, and the rear module mounting panel 60 may connect the rear pillars 30 on both sides.

The rear pillar 30 may include a pillar panel support portion 32 curved to surround the rear module mounting panel 60.

The cross member 40 and the rear module mounting panel 60 are formed to connect the rear pillars 30 on both sides of the of vehicle body 10, and the pillar panel support portion 32 surrounds the cross member 40 and the rear module mounting panel 60. Therefore, the connection strength between the rear pillar 30 on both the sides and the cross member 40 and the rear module mounting panel 60 may be secured, and the collision load may be easily distributed.

The mounting portion 70 may be formed adjacent to the pillar panel support portion 32.

Accordingly, the collision load transmitted from the body rear element 100 during vehicle collision may be distributed to the rear pillar 30 and the cabin 20 through the mounting portion 70.

That is, referring to FIG. 5 and FIG. 6, the rear module mounting panel 60 may include a front protruding portion 84 forming a first load path LP1 that transmits the collision load in the forward direction of the vehicle body 10, and a width direction inclined portion 86 forming a second load path LP2 that transmits the collision load in a width direction of the vehicle body 10.

The front protruding portion 84 may be the protrude connection portion 84 described above.

The first load path LP1 may be extended to the battery cover 92 through the bend portion 85.

The rear module mounting panel 60 may include a main body 88 enclosing the cross member 40.

The width direction inclined portion 86 may be formed into a smooth curved shape, and may form the second load path LP2 for transferring the collision load transmitted to the mounting portion 70 to the main body 88.

The internal connection 76 forms a third load path LP3 and a fourth load path LP4 in the vertical direction, respectively, which may be extended to the battery cover 92 through the cross member horizontal surface 46.

Furthermore, the impact load transmitted to the lower portion of the second mounting protruding portion 79 may also be distributed through a fifth load path LP5 extending to the battery lower flange 94.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle body rear structure comprising:
   a cabin;
   a cross member; and
   a rear module mounting panel connected to the cabin, wherein at least a portion of the rear module mounting panel is disposed to contact with the cross member and the rear module mounting panel includes a mounting portion connected to a body rear element;
   a rear protruding portion connected to the body rear element; and
   a support portion contacting with the cross member,
   wherein the cross member is disposed within the rear module mounting panel.

2. The vehicle body rear structure of claim 1, wherein the mounting portion further includes:
   an internal connection connecting the rear protruding portion and the support portion.

3. The vehicle body rear structure of claim 2, wherein the support portion and the internal connection are connected to each other with an obtuse angle.

4. The vehicle body rear structure of claim 2, wherein a thickness of the support portion and the internal connection is formed to be thicker than other thicknesses of at least a portion of the mounting portion.

5. The vehicle body rear structure of claim 2, wherein the cross member includes:
   a main cross surface directly in contact with the support portion; and
   a cross member horizontal surface disposed toward a portion where the support portion and the internal connection are connected.

6. The vehicle body rear structure of claim 2, wherein the rear protruding portion includes:
   a first mounting protruding portion connected to a vehicle body rear module; and
   a second mounting protruding portion connected to a rear sub-frame.

7. The vehicle body rear structure of claim 2,
   wherein the cabin includes a partition panel formed at a rear thereof, and
   wherein the rear module mounting panel includes a front connection portion connected to the partition panel.

8. The vehicle body rear structure of claim 7, wherein the rear module mounting panel further includes a module connection portion for connecting the mounting portion and the front connection portion.

9. The vehicle body rear structure of claim 8, wherein the rear module mounting panel further includes a protrude connection portion formed to protrude to the mounting portion and the module connection portion.

10. The vehicle body rear structure of claim 8, further including a battery cover disposed between the cabin and the cross member, wherein a portion of the battery cover is in contact with the cross member.

11. The vehicle body rear structure of claim 10,
wherein the rear module mounting panel further includes a bent portion connecting the mounting portion and the module connection portion, and
wherein the bent portion supports the battery cover.

12. The vehicle body rear structure of claim 10, wherein the battery cover includes a battery lower flange connected to the cross member and the rear module mounting panel.

13. The vehicle body rear structure of claim 1,
wherein the cabin includes rear pillars formed on first and second sides of a vehicle body in a vertical direction of the vehicle body, and
wherein the rear module mounting panel connects the rear pillars on the first and second sides.

14. The vehicle body rear structure of claim 13, wherein each of the rear pillars includes a pillar panel support portion curved to surround the rear module mounting panel.

15. The vehicle body rear structure of claim 14, wherein the mounting portion is formed adjacent to the pillar panel support portion.

16. The vehicle body rear structure of claim 1, wherein the rear module mounting panel further includes:
a front protruding portion forming a first load path that transmits a collision load in a forward direction of the vehicle body; and
a width direction inclined portion forming a second load path that transmits the collision load in a width direction of the vehicle body.

17. The vehicle body rear structure of claim 1, wherein the rear module mounting panel further includes a main body enclosing the cross member.

18. The vehicle body rear structure of claim 1, wherein the rear module mounting panel is made of Carbon Fiber Reinforced Plastic (CFRP) material.

19. The vehicle body rear structure of claim 1, wherein the cross member is made of steel material.

20. The vehicle body rear structure of claim 1, wherein the cabin includes a cabin rear protruding portion protruded toward the rear module mounting panel.

* * * * *